United States Patent [19]

Marsh

[11] Patent Number: 5,385,227
[45] Date of Patent: Jan. 31, 1995

[54] ELEVATING CONVEYOR FOR SMALL ARTICLES

[76] Inventor: Robert A. Marsh, 4151 Shimerville Rd., Emmaus, Pa. 18049

[21] Appl. No.: 98,061

[22] Filed: Jul. 29, 1993

[51] Int. Cl.⁶ .............................................. B65G 25/00
[52] U.S. Cl. .................................................. 198/773
[58] Field of Search ................ 198/443, 445, 446, 773

[56] References Cited

U.S. PATENT DOCUMENTS

| | | |
|---|---|---|
| 1,696,803 | 12/1928 | Kronqvist . |
| 2,818,967 | 1/1958 | Bogle . |
| 3,139,973 | 7/1964 | Rivers . |
| 3,255,867 | 6/1966 | Allen et al. ..................... 198/773 |
| 3,265,195 | 8/1966 | Ford . |
| 3,524,532 | 8/1970 | Hobbs . |
| 3,746,147 | 7/1973 | Ford . |
| 4,215,966 | 8/1980 | Cooper . |

*Primary Examiner*—Joseph E. Valenza
*Attorney, Agent, or Firm*—Shoemaker and Mattare Ltd.

[57] ABSTRACT

A elevating conveyor for capsules includes two pairs of alternately reciprocating plates driven by respective pitman arms from a centerless pulley. The plates are inclined from the vertical, so that small articles roll onto the top surface of each plate as it becomes even with that of the preceding plate.

10 Claims, 5 Drawing Sheets

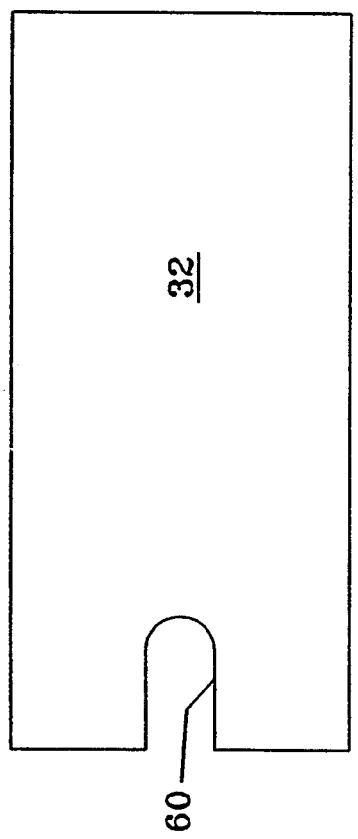
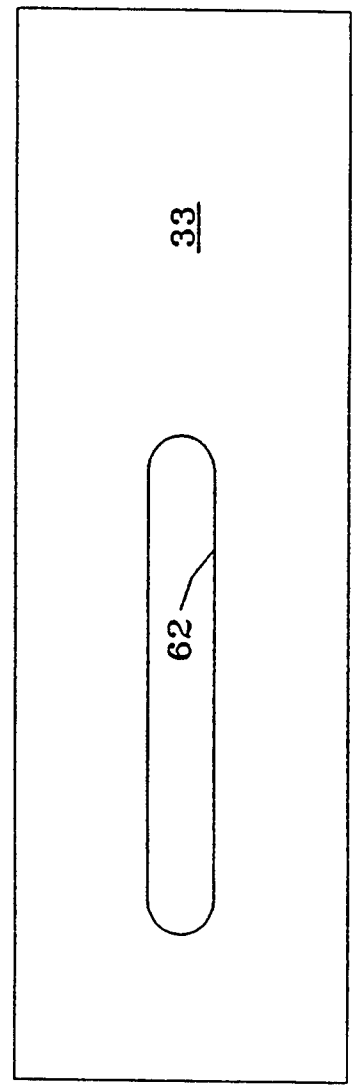
FIG. 4
FIG. 5

ELEVATING CONVEYOR FOR SMALL ARTICLES

BACKGROUND OF THE INVENTION

This invention relates to an elevating conveyor for small articles like capsules.

To raise small, randomly oriented articles from one level to another is a task for which certain types of conveyors, such as belt conveyors, are not appropriate. When the articles are more or less round, so that they roll easily, continuous inclined surfaces cannot be used. Therefore, prior inventors have provided various arrangements including alternately reciprocating inclined plates or the like, similar to those described below.

I have found prior devices of this nature not to be suitable for certain applications, such as pharmaceutical delivery, because their drives are objectionably noisy and sometimes insufficiently reliable, and because they tend to generate intolerable particulate matter.

SUMMARY OF THE INVENTION

An object of the invention is to provide a substantially noiseless elevating conveyor for small articles.

Another object of the invention is to improve the reliability of an elevating conveyor having alternately reciprocating plates for lifting articles.

A further object of the invention is to reduce the generation of particulate matter by a conveyor.

These and other objects are attained by an elevating conveyor comprising a stack of at least one pair of plates independently reciprocable along parallel paths, and means for driving the plates out of phase with one another. The plates have sloping upper surfaces, so that articles roll or slide from the top of one plate to the next as neighboring plates become aligned. The conveyor has an improved plate drive, which comprises a centerless crankwheel and a pair of pitman arms connected to opposite sides of the crankwheel, for driving the respective plates.

BRIEF DESCRIPTION OF THE DRAWINGS

In the accompanying drawings,

FIGS. 4 and 5 are detailed elevational views of two elevating plates of the device.

DESCRIPTION OF THE PREFERRED EMBODIMENT

Figure 1:
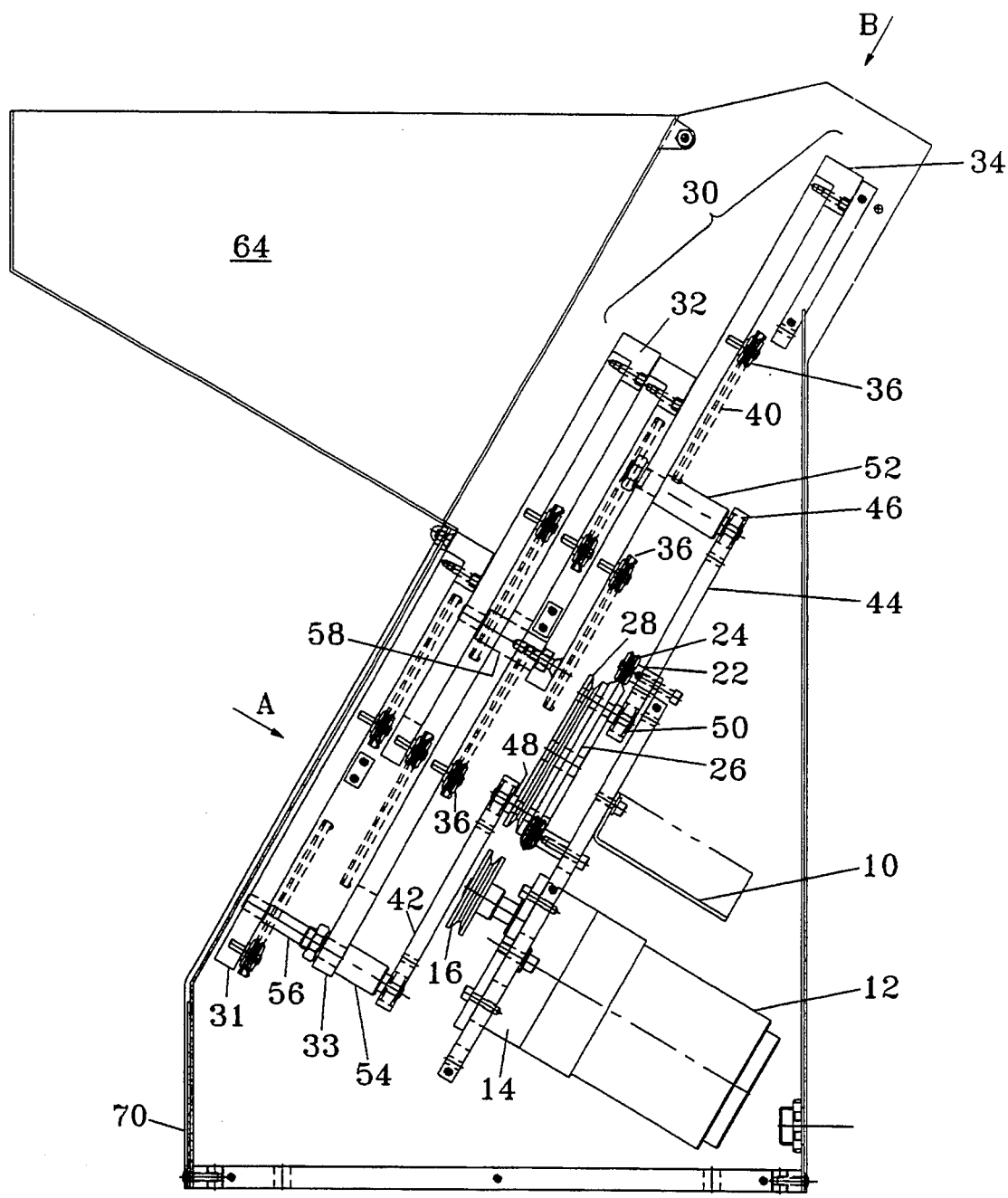
FIG. 1 is a diagrammatic side elevation showing major components of an elevating conveyor for capsules embodying the invention.

An elevating conveyor for capsules embodying the invention, as shown in FIG. 1, includes a frame 10, which supports a variable speed fractional horsepower electric motor 12 mounted on an oblique axis. The motor has a gear reduction unit 14 built in, and a drive pulley 16 is affixed on the output shaft of the unit. A drive belt 18 connects the drive pulley 16 to a larger driven pulley 20 which functions as a crankwheel. The crankwheel is supported not by a shaft, but rather only peripherally, by four wheels 22, each of which has a circumferential V-groove 24 conforming to the shape of a circumferential ridge 26 on the crankwheel, to one side of the belt groove 28. This arrangement permits pitman arms, described below, to be connected to either side of the driven pulley, because there is no shaft interference.

Above and in front of the driven pulley, there is a stack 30 of four reciprocable plates, two of which are illustrated in detail at FIGS. 4 and 5. Each of the four plates 31, 32, 33 and 34 is supported by four rollers 36 between a respective pair of parallel rails 40. The rails are affixed to the machine frame along an oblique axis, that is, one which is neither vertical nor horizontal, so that their top surfaces slope in a common direction. The preferred inclination angle is approximately 30°, as seen in FIG. 1.

Figure 2:
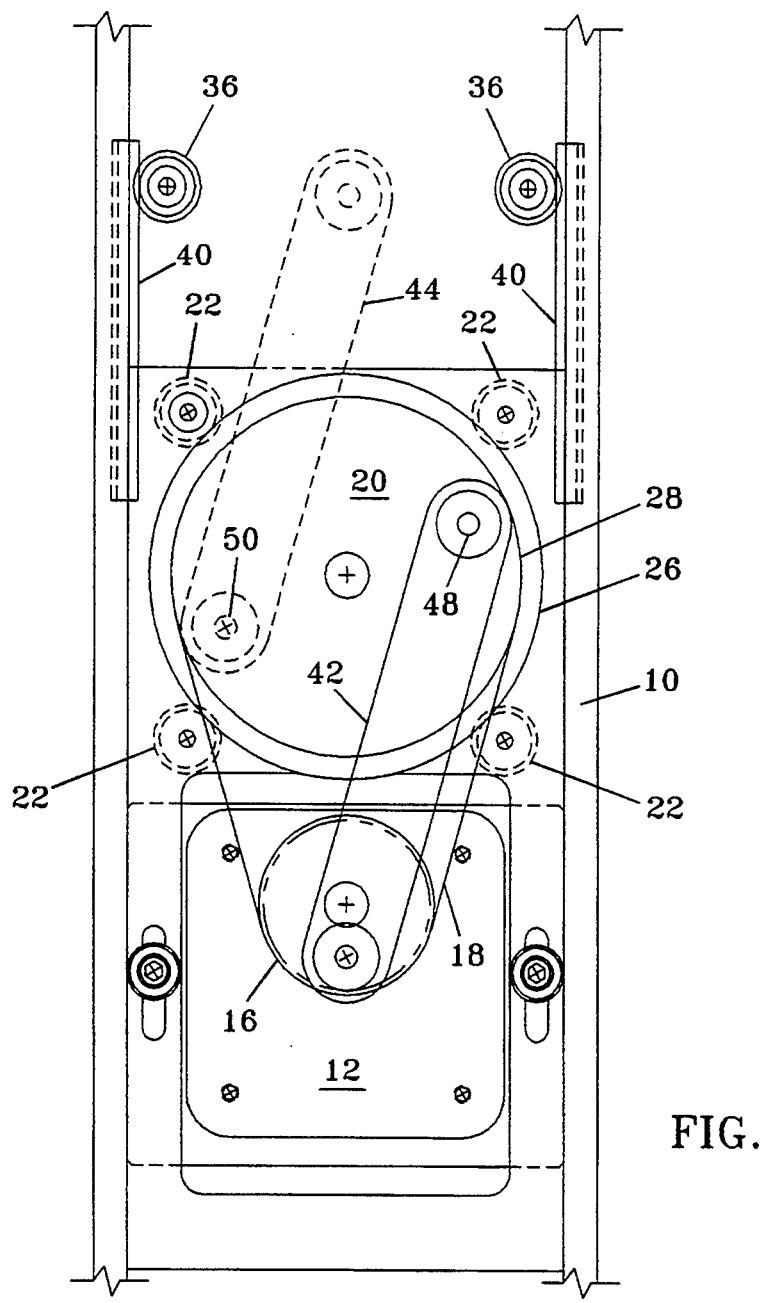
FIG. 2 is a view taken in the direction "A" in FIG. 1.
Figure 3:
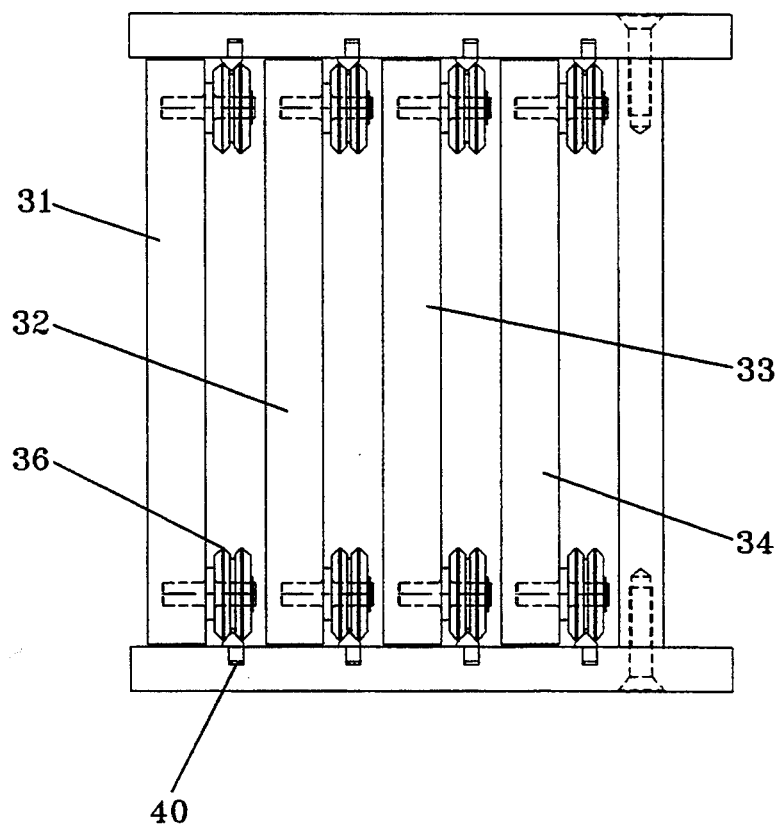
FIG. 3 is a view taken in the direction "B" in FIG. 1.

The plates are connected to the driven pulley 20 by a pair of pitman arms 42, 44, depicted in FIG. 2. Each pitman arm has a pair of sealed bearings 46, one installed in the arm at either end. Axially extending crankpins 48 and 50 are affixed to the driven pulley at a radius R from the center of the pulley. Each of these pins passes through one of the pitman bearings.

The other ends of the arms are similarly connected to the plates. A pin 52 extending from the rear of the fourth plate 34 passes through the bearing at the upper end of the upper arm 44, while a pin 54 extends from the rear of the third plate 33, through the bearing at the lower end of the lower arm 42.

Now, the first and third plates 31, 33 are interconnected by a pin 56, so that they reciprocate in unison. The second and fourth plates 32, 34 are likewise interconnected by a pin 58. To avoid interference with the pins interconnecting their neighboring plates, the second and third plates are slotted at 60,62 (FIGS. 4 and 5 respectively).

The plates are not all the same size. The second plate is shorter than the fourth, so that its upper surface is a distance of approximately 4 R below that of the fourth plate. And the top of the first plate is about 4 R below the top of the third plate, or preferably slightly less than 4 R, so that each plate rises about a sixteenth of an inch above its neighbor at the top of its stroke. This stroke overlap, which can be seen in FIG. 1, provides a dwell period during which the articles can roll or slide onto the next plate.

FIG. 1 illustrates the foremost (first) plate at the bottom of its stroke, in a position to receive articles from a hopper 64. The top of the plate in this position is even with, or just slightly below, the bottom of the hopper, so that articles can move onto the top surface.

As the motor turns the driven pulley, it drives the plates up and down in alternating fashion via the pitman arms. The stroke of each plate equals 2 R, so that after 180° of driven pulley rotation, the tops of the third and fourth plates are about even, as are the tops of the first and second plates. Articles can thus roll or fall from one plate to the next, and this progression continues until the articles atop the fourth plate are discharged from the system to a receiver not shown.

The absence of chains, toothed belts and gears from the system minimizes production of particulate matter, and also produces little noise, making the apparatus suitable for use in quiet environments. A particularly contemplated application is for lifting pills or medicine capsules in a pharmaceutical plant.

Figure 6:
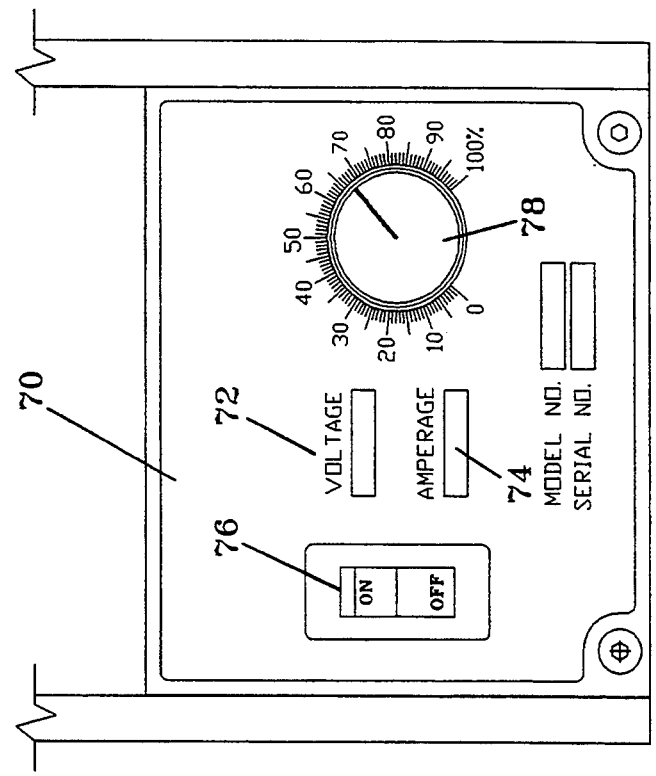
FIG. 6 is a front elevation of a control panel associated with the invention.

FIG. 6 shows a control panel 70, whose location on the device is shown in FIG. 1. The panel contains digital indicators 72,74 for motor voltage and current respectively, an illuminated power switch 76, and a speed control knob 78 surrounded by indicia representing percent of maximum speed. The power switch includes a magnetic circuit breaker to protect the apparatus and workers. A preferred switch is Model No. MF1B3444301BD62C from Carlingswitch, Inc., Plainville, Conn.

The speed control knob is affixed to a speed potentiometer (not shown), which is a component of a solid-state speed controller connected with the motor 12. One can thus control the rate at which parts are moved through the device.

It is expected that the invention may be modified from the preferred form described above. For example, while the plates described above are parallelipipeds, tilted from the vertical so as to provide inclined top surfaces, other plate shapes could be used. For example, the plates could be exactly vertical, and their tops beveled to provide the slope necessary to make the parts roll forward. More generally, while items 31–34 are described as "plates" other structures may be used. Any movable member having a sloping article supporting surface might be substituted for the plates described; hence the use of a generic term in the claims.

Although the preferred embodiment of this invention has two pairs of plates, any plural number of plates could be used, so modifications along this line may be expected.

Grooved rollers are preferred for supporting the plates and the driven pulley; however, various other hardware might be employed for performing the same function. Also, while the pitman arms are described as being mounted to the driven pulley 180° apart, it is conceivable that the spacing might be otherwise; it is only necessary that neighboring plates be reciprocated out of phase with one another, and that their top surfaces be aligned at some point.

Since the invention is subject to modifications and variations, it is intended that the foregoing description and the accompanying drawings shall be interpreted as illustrative of only one form of the invention, whose scope is to be measured by the following claims.

I claim:

1. An elevating conveyor for small articles comprising
   a stack of at least one pair of article supporting members, independently reciprocable along parallel paths, and
   means for driving the members out of phase with one another in such a way that articles can roll or slide from one member to another, wherein the driving means comprises
   a centerless crankwheel supported only at its periphery, and a pair of pitman arms connected out of phase with one another to opposite sides of the crankwheel, each of the pitman arms also being connected to a respective one of said members.

2. The invention of claim 1, wherein each of said article supporting members has an upper surface for supporting conveyed articles thereon, and said upper surfaces are sloped in a common downstream direction so that the articles can roll or slide from the upper surface of one member to that of a neighboring member when the surfaces are aligned.

3. The invention of claim 2, wherein the upper surface of each of said members moves through a respective stroke, and the strokes of neighboring members overlap slightly to provide a dwell period during which articles can move from one surface to the next.

4. The invention of claim 3, wherein each stroke has an upper limit, and the upper limits of the strokes of the members are progressively higher in one direction, so that articles are elevated by the unit in that direction.

5. The invention of claim 1, wherein said plates are parallelipipeds.

6. The invention of claim 1, wherein each of said plates is supported by rollers running on parallel stationary rails.

7. The invention of claim 1, wherein each said pitman arms is connected to the crankwheel by a crankpin affixed to the crankwheel and extending, from a respective side of the crankwheel, through a bearing in the pitman arm.

8. The invention of claim 1, wherein the crankwheel has a periphery, the conveyor has a frame, and further comprising
   at least three rollers supported on the frame on parallel axes and in a common plane, said rollers having a surface contour complementary to that of the crankwheel periphery, so as to provide centerless support for the crankwheel and to constrain said crankwheel to rotation within said plane.

9. The invention of claim 1, wherein said motor is a variable speed motor, and further comprising means for controlling the speed of said motor.

10. The invention of claim 1, comprising plural pairs of said member, wherein alternate members within the stack are interconnected so that they reciprocate in unison.

* * * * *